(12) United States Patent
Thompson et al.

(10) Patent No.: US 11,204,435 B1
(45) Date of Patent: Dec. 21, 2021

(54) METHODS AND SYSTEMS FOR MEASURING AND ANALYZING BUILDING DYNAMICS

(71) Applicant: Safehub Inc., San Francisco, CA (US)

(72) Inventors: Andrew C. T. Thompson, San Francisco, CA (US); Clement B. Barthes, Berkeley, CA (US); Douglas O. Frazier, San Rafael, CA (US); Alessio Vallero, Berkeley, CA (US)

(73) Assignee: Safehub Inc., San Francisco, CA (US)

( * ) Notice: Subject to any disclaimer, the term of this patent is extended or adjusted under 35 U.S.C. 154(b) by 333 days.

(21) Appl. No.: 16/125,253

(22) Filed: Sep. 7, 2018

Related U.S. Application Data

(60) Provisional application No. 62/607,251, filed on Dec. 18, 2017, provisional application No. 62/557,667, filed on Sep. 12, 2017.

(51) Int. Cl.
*G01V 1/28* (2006.01)
*G01V 1/30* (2006.01)
*G01P 15/00* (2006.01)

(52) U.S. Cl.
CPC ............ *G01V 1/288* (2013.01); *G01P 15/003* (2013.01); *G01V 1/306* (2013.01)

(58) Field of Classification Search
None
See application file for complete search history.

(56) References Cited

U.S. PATENT DOCUMENTS

| | | | | |
|---|---|---|---|---|
| 5,101,195 A | * | 3/1992 | Caillat | G08B 21/10 340/540 |
| 5,726,637 A | * | 3/1998 | Miyahara | G08B 29/16 169/23 |

(Continued)

FOREIGN PATENT DOCUMENTS

CN 204480445 U * 7/2015

OTHER PUBLICATIONS

Kawahara et al., "Design and Implementation of a Sensor Network Node for Ubiquitous Computing Environment" 2003 IEEE (Year: 2003).*

(Continued)

*Primary Examiner* — John C Kuan
(74) *Attorney, Agent, or Firm* — Silicon Edge Law Group LLP; Arthur J. Behiel (57) ABSTRACT

A network of motion sensors employs sensitive accelerometers to issue time-domain measurements of building movement from multiple locations within and between buildings and other structures. The time-domain measurements from the various motion sensors are synchronized and converted into frequency-domain measurements of building movement. Individual motion sensors can be equipped with the requisite processor and memory to synchronize and covert the time-domain measurements. The motions sensors can classify detected events into various event types, such as earthquakes, wind events, or bipedal locomotion. The sensors can also communicate with one another or other resources to calculate event probabilities. A motion sensor may, for example, receive an earthquake-verification signal responsive to an earthquake-verification request. The network of motion sensors can calculate local soil stiffness and financial loss estimations responsive to their individual or collective frequency-domain measurements.

18 Claims, 11 Drawing Sheets

(56) References Cited

U.S. PATENT DOCUMENTS

| | | | | |
|---|---|---|---|---|
| 6,292,108 | B1* | 9/2001 | Straser | G01B 21/32 |
| | | | | 340/539.1 |
| 8,289,160 | B1 | 10/2012 | Billman | |
| 8,730,039 | B1 | 5/2014 | Billman | |
| 9,086,430 | B2 | 7/2015 | Rice et al. | |
| 9,449,491 | B2 | 9/2016 | Sager et al. | |
| 9,983,776 | B1* | 5/2018 | Wu | G01H 3/04 |
| 2003/0040934 | A1 | 2/2003 | Skidmore et al. | |
| 2006/0263152 | A1* | 11/2006 | Conroy | E02D 1/00 |
| | | | | 405/303 |
| 2009/0222210 | A1 | 9/2009 | Meskouris et al. | |
| 2014/0313032 | A1 | 10/2014 | Sager et al. | |
| 2014/0324356 | A1* | 10/2014 | Park | G01M 5/0066 |
| | | | | 702/15 |
| 2015/0019267 | A1 | 1/2015 | Prieto et al. | |
| 2015/0073834 | A1 | 3/2015 | Gurenko et al. | |
| 2015/0154715 | A1 | 6/2015 | Wedig et al. | |
| 2015/0355050 | A1* | 12/2015 | Yoshida | G01M 5/0066 |
| | | | | 702/56 |
| 2016/0173963 | A1* | 6/2016 | Filson | G05D 23/1902 |
| | | | | 340/870.09 |
| 2017/0169534 | A1* | 6/2017 | Wani | G06Q 30/0283 |
| 2017/0220718 | A1* | 8/2017 | Freeman | G01M 5/0033 |
| 2018/0376314 | A1* | 12/2018 | Allen | H04W 4/90 |
| 2020/0003918 | A1* | 1/2020 | Vancho | G08B 21/10 |

OTHER PUBLICATIONS

Pastén et al., "Deep characterization of the Santiago Basin using HVSR and cross-correlation of ambient seismic noise" Engineering Geology 201 (2016) 57-66 (Year: 2016).*

Hsu et al., "A damage detection algorithm integrated with a wireless sensing system" Journal of Physics: Conference Series 305 (2011) (Year: 2011).*

Lei et al., "Intelligent Monitoring of Multistory Buildings under Unknown Earthquake Excitation by a Wireless Sensor Network" Hindawi Publishing Corporation International Journal of Distributed Sensor Networks vol. 2012, Article ID 914638, 14 pages (Year: 2012).*

Porter et al. "Real-Time Loss Estimation for Instrumented Buildings" Technical Report EERL Aug. 2004, Earthquake Engineering Research Laboratory, California Institute of Technology, Kajima Corporation, Pasadena (California) 2004 (Year: 2004).*

Vidal et al., "Changes in dynamic characteristics of Lorca RC buildings from pre- and post-earthquake ambient vibration data" Bull Earthquake Eng (2014) 12:2095-2110 (Year: 2014).*

Wikipedia, "Z-Wave," Retrieved from https://en.wikipedia.org/w/index.php?title=Z-Wave&oldid=794733242, last edited on Aug. 9, 2017, at 19:09 (7 pages).

Wikipedia, "zigbee," Retrieved from https://en.wikipedia.org/w/index.php?title=Zigbee&oldid=794808447, last edited on Aug. 10, 2017 at 5:08 (12 pages).

Wair, Dejong, and Shantz, "Guidelines for Estimation of Shear Wave Velocity Profiles," Pacific Earthquake Engineering Research Center Headquarters at the University of California, Dec. 2012 (95 pages).

Watkins et al., "Validation of Adaptive Threshold Spike Detector for Neural Recording," Proceedings of the 26th Annual International Conference of the IEEE EMBS, San Francisco, CA, USA • Sep. 1-5, 2004 (4 pages).

Wikipedia, "Thread (network protocol)," retrieved from https://en.wikipedia.org/w/index.php?title=Thread_(network_protocol)&oldid=788563916, last edited on Jul. 2, 2017, at 03:51 (2 pages).

Adhikari, "Damping Models for Structural Vibration," Cambridge University Engineering Department, a dissertation submitted to the University of Cambridge for the Degree of Doctor of Philosophy, Sep. 2000 (228 pages).

Nakamura, "On the H/V Spectrum," The 14th World Conference on Earthquake Engineering, Oct. 12-17, 2008, Beijing, China (10 pages).

U. S. Geological Survey, "USGS ShakeCast," Fact Sheet 2007-3086, Oct. 2007 (6 pages).

Stmicroelectronics, "MEMS motion sensor: three-axis digital output accelerometer, Datasheet—production data," document DocID030220 Rev 2, May 2017 (30 pages).

Goel and Chopra, "Vibration Properties of Buildings Determined from Recorded Earthquake Motions," College of Engineering, University of California at Berkeley, Report No. UCB/EERC-97/14, Dec. 1997 (286 pages).

Freescale Semiconductor, "Accelerometer Terminology Guide," Freescale Semiconductor, Inc., Document SENSORTERMSPG, Rev 0, May 2007 (3 pages).

Wikipedia, "Motion Detector," retrieved from https://en.wikipedia.org/w/index.php?title=Motion_detector&oldid=767920833, last edited on Feb. 28, 2017, at 18:52 (3 pages).

Clayton et al., "Community Seismic Network: A Dense Array to Sense Earthquake Strong Motion," Seismological Research Letters vol. 86, No. 5 Sep./Oct. 2015 (10 pages).

Grossi and Kunreuther, "Catastrophe Modeling: A New Approach to Managing Risk," Huebner International Series on Risk, Insurance, and Economic Security, © 2005 Springer Science + Business Media, Inc.(256 pages).

Hanly, "Accelerometers: Taking the Guesswork out of Accelerometer Selection," retrieved from https://blog.mide.com/accelerometer-selection[Jul. 17, 2006 8:46:52 AM], Mar. 11, 2016 (16 pages).

Goulet et al, "Data-driven post-earthquake rapid structural safety assessment," Earthquake Engineering Structural Dynamics, Apr. 2015 (20 pages).

Michel et al., "Comparison between seismic vulnerability models and experimental dynamic properties of existing buildings in France," Bull Earthquake Eng., May 20, 2010 (13 pages).

Gueguen et al., "Testing Buildings Using Ambient Vibrations for Earthquake Engineering: A European Review," 2nd European Conference on Earthquake Engineering and seismology, Aug. 25-29, 2014 (12 pages).

Brownjohn, "Ambient vibration studies for system identification of tall buildings," Earthquake Engineering and Structural Dynamics, John Wiley & Sons, Ltd., Apr. 2002 (25 pages).

Mazarakis et al., "A Prototype Sensor Node for Footstep Detection," IEEE 2005 (4 pages).

Michel et al., "Dynamic parameters of structures extracted from ambient vibration measurements: an aid for the seismic vulnerability assessment of existing buildings in moderate seismic hazard regions," Soil Dynamics and Earthquake Engineering 28, Oct. 2007 (40 pages).

* cited by examiner

METHODS AND SYSTEMS FOR MEASURING AND ANALYZING BUILDING DYNAMICS

BACKGROUND

How a building resonates with ground excitation is in large part a function of the soil properties (stratigraphy and material properties) supporting and surrounding the building. Soil properties significantly affect site amplification: soft soils will generally increase accelerations locally due to the conservation of energy. Soil properties also significantly impact the dynamic behavior of the combined soil-structure system.

Although there is detailed soil information available for major metropolitan areas of the West Coast of the United States, this information is based on the interpretation of large-scale geologic maps that are unable to accurately assess the local variability in soils conditions from site to site. Such maps do not have the ability to assess the variation in soil properties as a function of depth, further limiting their usefulness. Since earthquake property damage and loss is greatly influenced by soil amplification from earthquakes, accurate soils information will improve earthquake risk estimates. Currently, better estimates can be obtained from in-situ geotechnical engineering evaluations, but these are costly and cannot be scaled to multiple sites.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1A:
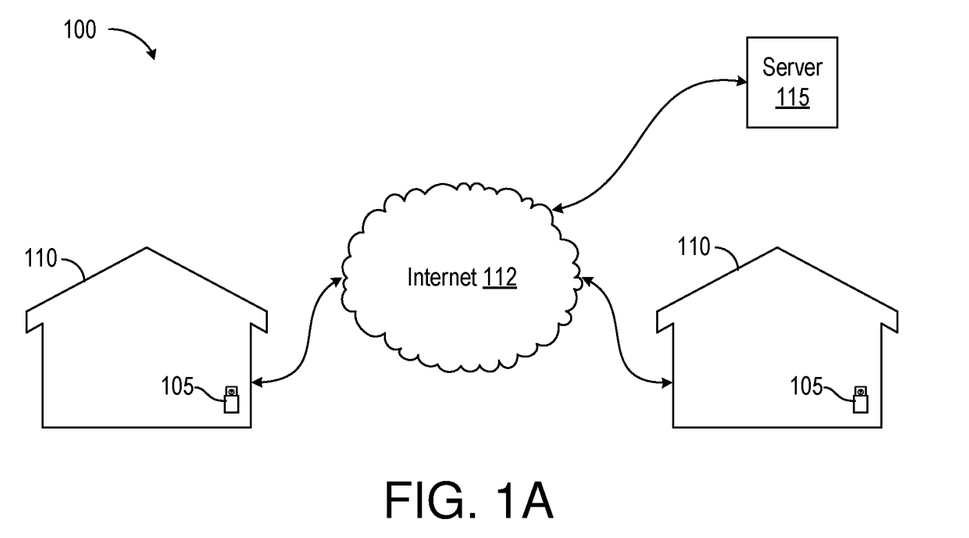
FIG. 1A depicts a distributed network 100 in which security appliances 105 equipped with sensitive accelerometers and installed within and physically coupled to respective buildings 110 collect and process acceleration time-history data.

FIG. 1A depicts a distributed network 100 in which security appliances 105 equipped with sensitive accelerometers and installed within and physically coupled to respective buildings 110 collect and process acceleration time-history data. Security appliances 105 are connected to the Internet 112 via Ethernet, Wi-Fi, Cellular, or other depending on availability and data requirements. Raw and/or processed data is sent to a remote server 115 to initiate alerts, dashboard analytics, and for remote storage. Alerts can also be sent through the appliance itself, through an integrated loudspeaker, for example. Raw acceleration data may also be stored locally on each appliance 105 for e.g. thirty days. Access to this local data, firmware updates, and device troubleshooting occur remotely. Processed and raw accelerometer data can be used to provide monitoring, alert, and information services to home owners, tenants, building owners, and insurers through desktop dashboard displays and mobile push notifications.

Security appliances 105 monitor acceleration data over time to establish thresholds against which to compare contemporary data. Anomalies in acceleration data can be indicative of human activity, such as the presence of an intruder, or of potentially harmful external events, such as storm or earthquakes. Security appliances 105 can classify movements based on acceleration data to generate reports, issue alarms, and assess risks. In this context, a "movement" can be a motion, which normally refers to relatively "slow" changes in position or velocity. Some examples include human motion and waves. A movement might also be a vibration (e.g. from an electric motor) or a shock that excites a structure's resonance. Buildings 110 can be any or a mix of single-family homes, low-, mid- and high-rise residential or commercial buildings, though security appliances 105 are equally applicable in industrial facilities, including manufacturing, telecommunications, power, data, and mission-critical.

Figure 1B:
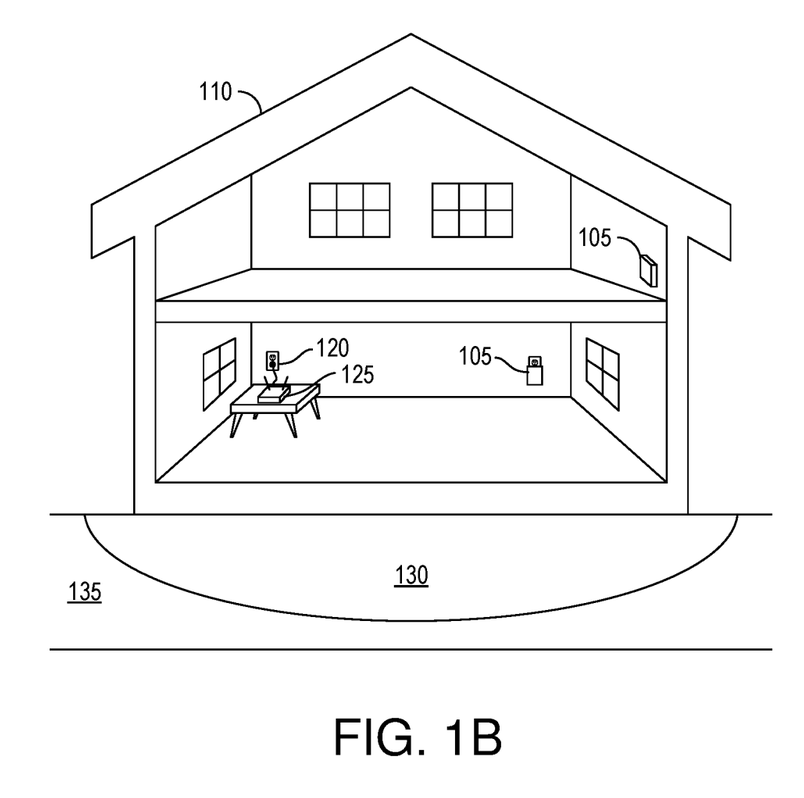
FIG. 1B depicts a building 110 with multiple security appliances 105 physically and electrically coupled to the structure via conventional outlets 120.

FIG. 1B depicts a building 110 with multiple security appliances 105 physically and electrically coupled to the structure via conventional outlets 120. A wireless router 125 provides an Internet connection for appliances 105. Building 110 rests on soil 130 over bedrock 135, the combination of which exhibits site-specific soil properties (stratigraphy and material properties) that interact with resonant properties of building 110 to determine how building 110 resonates with ground excitation due to e.g. earthquakes.

Earthquake waves propagating from the ruptured earthquake fault plane to a property are described via a series of ground motion prediction equations (GMPE) related to the magnitude of the quake, distance from fault rupture to dwelling, type of fault, and other factors. In general, the higher the ground motions, the higher the expected property damage. However, the soil properties under the property can significantly amplify the motion estimated by the GMPE, thereby increasing the expected property damage. The soil can also resonate with the structure, thereby increasing the importance of natural period and stiffness of the soil. Typically, a property on a hard, rock-like material will sustain much less damage than one founded on soft soils, which will amplify earthquake waves much more than hard rock. Thus the seismic engineering profession includes the effects of soil amplification in seismic codes, and in probabilistic risk analyses of individual properties and portfolios of properties.

Two methods are conventionally used to establish the soils amplification for a site. The first method, sometimes called a Seismic Cone Penetrometer Test (SCPT), involves drilling a hole thirty-meters deep into the ground at the site and measuring the time it takes for a shear wave (Vs30) induced vibration to travel from the bottom of the hole to the surface. This timing is correlated with observed soils amplifications to estimate a site-specific amplification factor. The second method employs geologic maps published by the United States Geological Survey (USGS) or state geological agencies to identify rock and soils properties by age and type, for example muds, sand deposits, sandstone, and granite. Researchers have developed relationships between Vs30 and these descriptive soils/rock types that allow those of skill in the art to estimate site-specific Vs30 without drilling.

SCPT measures Vs30, not direct amplification, and only for the top thirty meters of soil. This method thus overlooks the contribution to amplification for softer soils or geologic basin effects below this level. The application of the SCPT is also limited due to the additional time, cost, and inconvenience of drilling onsite holes. These burdens are prohibitive for a large portfolio of properties where SCPT cannot scale to nearby sites or even for a typical single home site when performing a seismic risk study. Geologic maps advantageously allow for convenient, low-cost Vs30 estimates but rely upon statistical correlations between geologic maps and Vs30 for site specificity. They also do not provide sufficient granularity to reliably estimate the actual soil condition at each property site. Since soils are a very non-homogeneous material, extrapolating the area wide geologic map data to a single site can result in incorrect Vs30 values.

In contrast to conventional equipment and methods, a network of security appliances 105, coupled with geophysical-based algorithms, permits the direct estimation of the site amplification factor and minimizes the uncertainty from Vs30 to amplification factor correlations as well as the granularity and assignment of Vs30 values from the geologic maps. Engineers and scientists can measure the actual ground shaking at each property during a major earthquake, and will be able to increase the accuracy and decrease the uncertainty in risk studies.

Building 110 is equipped with two (or more) security appliances 105 in this example, which can be beneficial for a variety of reasons. In taller buildings, synchronized acceleration data from multiple devices can be used to calculate mode shapes and periods in the building. These mode shapes and periods can be used in risk models. Location diversity of appliances 105 can be used to characterize movement in a building. For example, if a door slams, the resultant guided waves will transmit to each device. The time difference between guided waves (symmetric and asymmetric) reaching a device, or the comparison between guided waves reaching multiple devices, can characterize that event. The medium (wood, concrete, etc.) may be considered. If there are multiple devices, then synchronized vibration data can be used to determine a repeatable event such as a door opening or closing. The end-user can then train the device by entering the name of each repeatable event (e.g. front door vs back door vs. side door). In one embodiment appliances 105 are synchronized with reference to the sign wave of the AC power-supply signal to the appliances or using on-board timing circuitry.

Although there is detailed soil information available for major metropolitan areas of the West Coast of the United States, this data is based on the interpretation of large-scale geologic maps that are unable to accurately assess the local variability in soils conditions from site to site. Such maps do not have the ability to assess the variation in soil properties as a function of depth, further limiting their usefulness. Since earthquake property damage and loss is greatly influenced by soil amplification from earthquakes, accurate soils information will improve earthquake risk estimates.

Appliances 105, individually and collectively, accumulate and process accelerometer data to provide site-specific measurements of soil properties and associated amplification. Soil response to ambient vibration (e.g. due to traffic and ocean waves) and small earthquakes is measured over long periods of time using in situ appliances, preferably installed in the lower levels of buildings, to approximate a free-field response. A process in accordance with one embodiment compares recorded accelerations between appliances 105 in a network. Another process computes soil properties using the horizontal to vertical spectra ratio (HVSR). HVSR techniques have been done using expensive, broad-band seismometer measurements over relatively short periods of time. Appliances 105 can employ less-sensitive, lower-cost accelerometers and much longer time periods to achieve similar results. Lower fidelity in the sensor can be offset by the significantly longer measurement periods made possible by permanently installed devices.

Initial soil properties, including associated amplification properties, can be achieved in a few weeks. More refined estimates are achieved over time, and following small and large earthquakes. If needed for modeling input, Vs30 (average shear-wave velocity to 30$m$) is back-calculated. For light structures, the principal effect of the site conditions is site amplification. For heavier structures, including mid- and high-rise buildings, and industrial facilities, site conditions affect both site amplification and dynamic response of the soil-structure system. Appliances 105 provide data for both aspects.

Other key properties for estimating how building 110 responds during earthquakes are the natural modes and periods of vibration of building 110 and the soil-structure system. These properties determine how the system resonates with the ground motion, affecting accelerations, forces, and damage during earthquakes. Normally, the first mode in each direction (side-to-side in most buildings, roof diaphragm deflection in tilt-ups) dominates. The effective period (accounting for increased flexibility due to soil and possible damage) for the first mode is of primary interest to engineers and modelers as this is the assumed period during a large earthquake.

The effective period Te is typically estimated using approximate methods based on building height, structural type, and other factors. Most design codes, portfolio catastrophe models, and site-specific risk assessment methodologies incorporate the work of Goel and Chopra, "Vibration Properties of Buildings Determined From Recorded Earthquake Motions," Report No. UCB/EERC-97/14, Earthquake Engineering Research Center, University of California at Berkeley (December 1997), which is incorporated herein by reference. In Goel and Chopra, instrumented buildings were used to develop upper- and lower-bound estimates for period Te (for tilt-up construction, other approximate equations are available). With an approximate 50% variation between bounds, and noting that accelerations and forces are proportional to 1/T for the theoretical elastic behavior for a majority of building stock, significant variability in estimated earthquake response is possible.

Appliances 105, possibly in combination with other appliances and remote server 115, determine mode shapes and natural periods directly. Time-domain wave-form data from ambient vibrations (e.g. from traffic and wind) and small earthquakes are converted to the frequency domain and averaged over long time periods, up to weeks. Elastic periods are then converted to effective periods for a variety of shaking intensities based on existing numerical relationships and ongoing data collection.

For flexible taller buildings (over approximately three stories), or for structures with flexible roof diaphragms (e.g. tilt-ups), mode shapes and periods are estimated after a few days, with more refined estimates being achieved over time and following small earthquakes. Rare strong earthquakes provide a wealth of valuable information on nonlinear (likely damaged) structural-dynamic properties, including the relationship between elastic and effective periods. Knowing building vibration periods—and therefore building stiffness—assists in quantifying the presence and effectiveness of retrofit. Most risk-reduction strategies change a structure's stiffness in addition to its strength and ductility.

Results from a preliminary sensitivity study confirm engineering judgment, and show that modelled losses are highly sensitive to changes in assumed properties of the soil-structure system. On a dwelling-specific basis, changing the soil properties by one NEHRP Soil Class (say from class D to class C) decreases mean loss estimates by up to 50%. Changing the effective natural period from one Goel-and-Chopra bound to another changes loss estimates by up to 40%.

Replacing generic modeling data with site-specific data collected by appliances 105 reduces loss uncertainty. This impact is most pronounced for single-building and small-portfolio assessments, and is especially valuable for highly protected risks, high-value facilities, and specialized risks. For very large portfolios, due to the Law of Large Numbers, the most pronounced impact—and of most interest to insurers and reinsurers—relates to tail-risk uncertainty (coefficient of variation) and its significant effect on pure-premiums for insurance and reinsurance pricing.

Existing methods of damage detection and assessment involve visual inspection by structural engineers or claims adjusters. These are expensive, time consuming, and it is often difficult to see damage to the structure through façades, partitions, and hung ceilings. In cases where intensity maps are used (e.g. USGS ShakeCast), damage estimates are coarse and are dependent on the timely release of information. Appliances 105 address this problem by recording an acceleration time-history wave during earthquake excitation and using this data for damage estimation. In one embodiment, for example, site-specific acceleration data is used to calculate spectral accelerations and displacements, which are input to vulnerability curves for the corresponding dwelling. This information, provided through dashboard and alerts delivered via networked storage and distribution resources, increases situational awareness for building owners, insurers, and other stakeholders. This technology is similar to USGS ShakeCast, an automated system for triggering post-earthquake response protocols, except that accelerometers 105 provide real-time, site-specific data in lieu of coarse regional information.

In another embodiment damage estimates are made by capturing changes in building dynamic properties following an event, such as an earthquake. Estimates can be based on observations in the record itself, or by noting period-elongation due to reduced stiffness of the soil-structure system, which potentially implies that that the structure sustained damage. The intent is not to provide a highly granular assessment of localized damage throughout the building, but more to provide an indication as to overall building damage, and to prioritize buildings that require further investigation by engineers.

Server 115 collects and transmits data that can be used to support earthquake early warning systems, providing perhaps ten to twenty seconds of warning of a damaging earthquake. This will allow people to protect themselves against falling hazards, and for critical equipment to be turned off. In one embodiment each networked appliance 105 is to be connected to the USGS ShakeAlert system for the West Coast of the United States when it goes live in 2018 (planned). Reports of the USGS ShakeAlert system can then be transmitted to appliances 105, which can responsively issue an alarm through an integrated loudspeaker, a networked device, an occupant's mobile device, etc.

Figure 2:
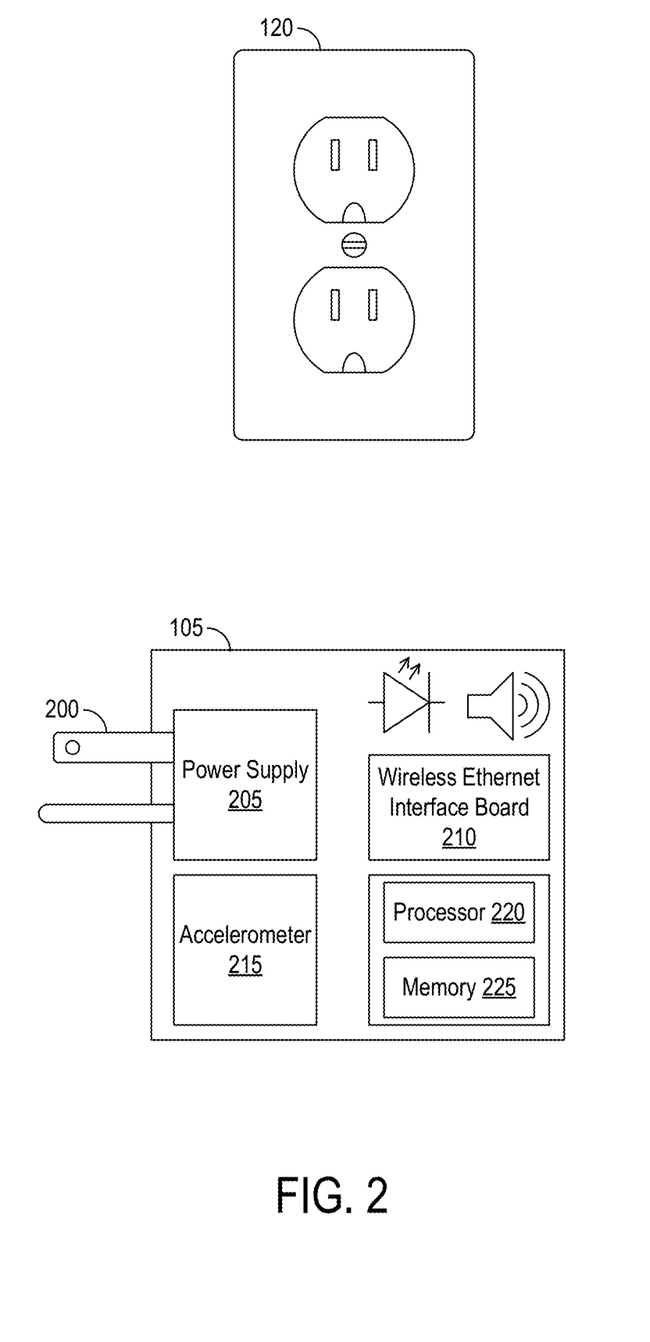
FIG. 2 is a block diagram of security appliance 105 of FIGS. 1A and 1B adjacent power outlet 120.

FIG. 2 is a block diagram of security appliance 105 of FIGS. 1A and 1B adjacent power outlet 120. Installation is simple. Electrodes 200 provide AC power to a power-supply 205, and also conduct vibrations from outlet 120, and thus building 110, to appliance 105. Appliance 105 also includes a wireless Ethernet interface board 210 that incorporates a transceiver (transmitter and receiver) of e.g. smart-building communication protocols such as BLUETOOTH™, ZIGBEE, Z-WAVE™, and THREAD, allowing for 1) the device to be a hub for a variety of sensors, including smoke, gas, water, and pressure; and 2) the appliances to communicate with each other. Interface board 210, if sending small packets of data, can use Internet-of-Things (IoT) communication protocols, and can incorporate support for cellular connectivity.

In some embodiments processor 220 and memory 225 support sophisticated methods for analyzing accelerometer and other data to make local decisions and reduce the amount of data sent over the network. For example, processor 220 can identify certain activities and events based upon calculations of the power spectral density (PSD) of the incoming acceleration data. This frequency-domain calculation can be done using Fast Fourier Transforms over a time frame of e.g. thirty seconds.

Appliance 105 can average, or "stack," frequency-domain measurements over longer time periods to characterize soil and structural properties. Soil data adequate for improving risk models may be acquired over several weeks, for example. Processor 220 converts samples of acceleration data into the frequency domain and translates the resultant frequency-domain data into natural frequencies of e.g. building 110 and soil 130. Natural frequencies may be identified using a peak-picking algorithm and soil properties evaluated using the Nakamura H/V technique. Structural period and soil are important characteristics of earthquake risk, and will be used to provide more granular information, based on fragility-curve data stored in e.g. memory 225.

Memory 225 maintains a database of historical sensor data and models for making predictions about activities taking place within building 110 and external events that may have some bearing on the safety and security of the dwelling and its occupants. Initial data and models may be provided with appliance 105 or downloaded from a suitable network resource, and are updated over time responsive to site-specific measurements.

Appliance 105 is powered by an AC supply current and can include a battery backup. An accelerometer 215 measures ambient vibration, as well as strong shaking, and is preferably sensitive with a low noise floor (less than 50 µg/√hz for example) and has a full scale of +/−2 g or greater, for example. Accelerometer 215 provides digital accelerometer data to a processor 220, which works with a memory 225 to store and process accelerometer data and related variables and information to perform functions detailed below. Accelerometer 215 can be a high-resolution, low-noise, three-axis linear accelerometer, such as an LIS3DHH MEMS motion sensor manufactured by STMicroelectronics.

Security appliance 105 can include or communicate with instruments that provide inputs for risk assessment, including measurements of air quality (humidity, carbon dioxide, carbon monoxide, radon, smoke, etc.), temperature, motion, audio, an infrared sensor, and a camera. (Suitable networked security devices are detailed in U.S. Pat. No. 9,449,491, which issued 20 Sep. 2016 to Sager and Rill and is incorporated herein by reference.) Processor 220 can combine disparate inputs to reduce error probabilities, and thus false alarms and errant reports. Including accelerometer data as input also eliminates blind spots because vibration travels through walls and other barriers to light and sound. In some embodiments one appliance 105 is responsible for combining the various inputs to arrive at alarm conditions, while some or all such processing can be distributed or accomplished remotely in other embodiments. Systems in which most or all of the requisite computations take place locally are less affected by e.g. power or network failures.

Processor 220 can work with other custom or general-purpose logic or processors in support of the methods detailed herein. In one embodiment processor 220 is instantiated as an artificial neural network that learns to identify activities and events without task-specific programming. Processor 220 can thus learn to distinguish normal from abnormal events and activities, and can acquire data for analysis and training.

Figure 3:
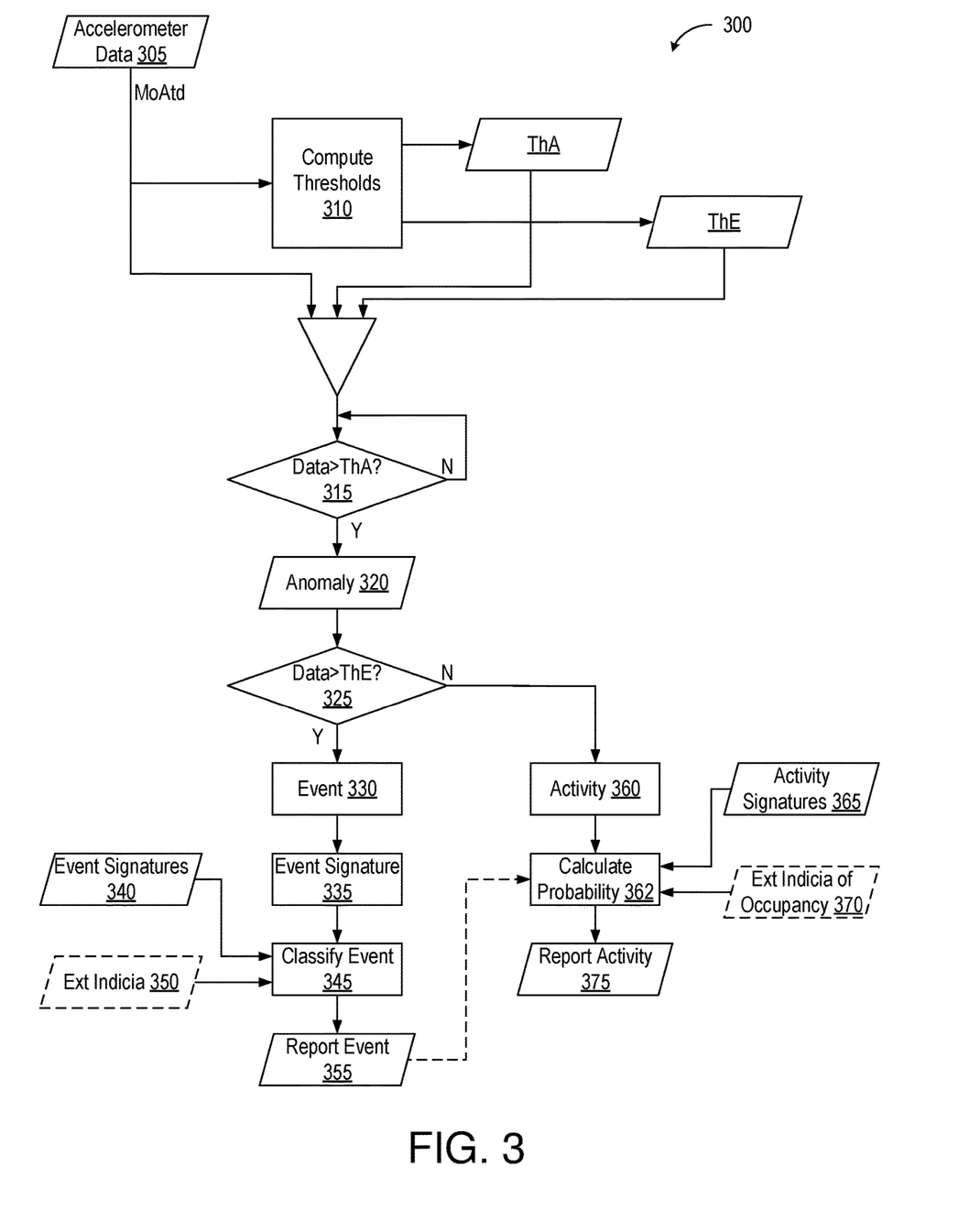
FIG. 3 is a flowchart 300 illustrating a process by which processor 220 and memory 225 identify anomalies within building 110 using accelerometer data 305.

FIG. 3 is a flowchart 300 illustrating a process by which processor 220 and memory 225 identify anomalies within building 110 using accelerometer data 305. In this context, an "anomaly" is a vibrational signature corresponding to human activity or events of interest. Activity generally can distinguish occupied and unoccupied states of a dwelling over days, weeks, or months. Events correspond to shorter time frames, and can be classified by type and reported accordingly. Events of interest may include those that pose structural risks, such as storms and earthquakes, and those that pose more personal risks, such as footfalls and door openings by unauthorized visitors.

Processor 220 uses time-domain measurements of acceleration MoAtd from accelerometer 215 to compute (310) an anomaly threshold ThA and an event threshold ThE. Anomaly threshold ThA can be computed during a quiet period, such as when people are sleeping or away. Appliance 105 calculates the standard deviation of site-specific ambient acceleration data and uses this standard deviation with incoming data to identify anomalies and classify events.

Processor 220 removes general fluctuations in the accelerometer readings by e.g. implementing a high-pass filter or taking a running mean over the data. Per decision 315, if measurements MoAtd are greater than the mean measurements of acceleration, over some time period T1, plus some factor of the standard deviation computed during the quite period, or are less than the mean minus the factor of the standard deviation, the measurements are said to exceed threshold ThA and processor 220 reports an anomaly 320. Per decision 325, if measurements MoAtd exceed threshold ThE, typically over a shorter time from T2, processor 220 flags an event 330.

Having flagged event 330, processor 220 analyzes measurements MoAtd framed within a time period of e.g. ten seconds encompassing event detection and to produce an event signature 335 for comparison with signatures 340 resident in e.g. memory 225. Processor 220 finds the best match with signature 335 to classify the event type (345), such as to distinguish a slamming door from an earthquake. External indicia of events 350, provided remotely or locally, can influence event classification. An event report from a remote appliance 105 could be used, for example, to distinguish an earthquake from a slammed door. Appliance 105 might also ping the USGS (or other) to confirm a detected earthquake. Appliance 105 can respond to a classified event in a manner appropriate to the event type, such as by reporting the event (355) to a remote home owner or issuing an audible alarm. Networked appliances 105 can share detected events or calculated probabilities of detected events among themselves for improved event resolution and reporting. If one of a network of neighboring appliances 105 computes a 90% probability of an earthquake at a time when the other appliances detect no event or different types of events than the appliance detecting the earthquake may reduce the assessed earthquake probability and update its signature database accordingly to reduce future false positives. Thus, while one or a local set of appliances 105 is effective, a distributed system that incorporates remote appliances 105 and other network resources for distributed computation and sensing is more effective.

Returning to decision 325, if anomaly 320 does not meet event threshold ThE processor 220 classifies anomaly 320 as a general activity 360 consistent with e.g. dwelling occupancy. Based on the general activity and/or the events that are triggered, appliance 105 can calculate a running probability 362 of human presence. Such calculations can take into considerations prior events 355 and activity signatures 365. Appliance 105 can also consider external indicia of occupancy 370, such as location data from occupants' mobile devices. Activity and events can be reported as e.g. labeled time charts, alerts, and reports 375. Alerts can be conveys to local or remote devices, such as to alert a homeowner to a problem or to let a parent know whether a child is home with our without companions. Reports can be published to a user's mobile device or browser as a plot of activity density over time or number of time one or both thresholds are exceeded per unit time (e.g., per minute). In one embodiment, an application associated with one or more security appliances 105 provides a living history of building 110 that summarizes events and activities over a variable time scale. A user might consider a day to note whether and how long a plumber was on sight, or may consider decades to view events, activity levels, and room-usage patterns that vary with a growing family.

In an embodiment that include an artificial neural network, appliance 105 uses location data from occupants' mobile devices as training data for learning to distinguish between occupied and unoccupied states. Other inputs, such as from integrated or shared sensors of air quality, temperature, motion, sound, infrared, and image data can be provided to the neural network for improved decision making. User feedback, provided via e.g. a mobile device, also supports improved decision making.

Figure 4:
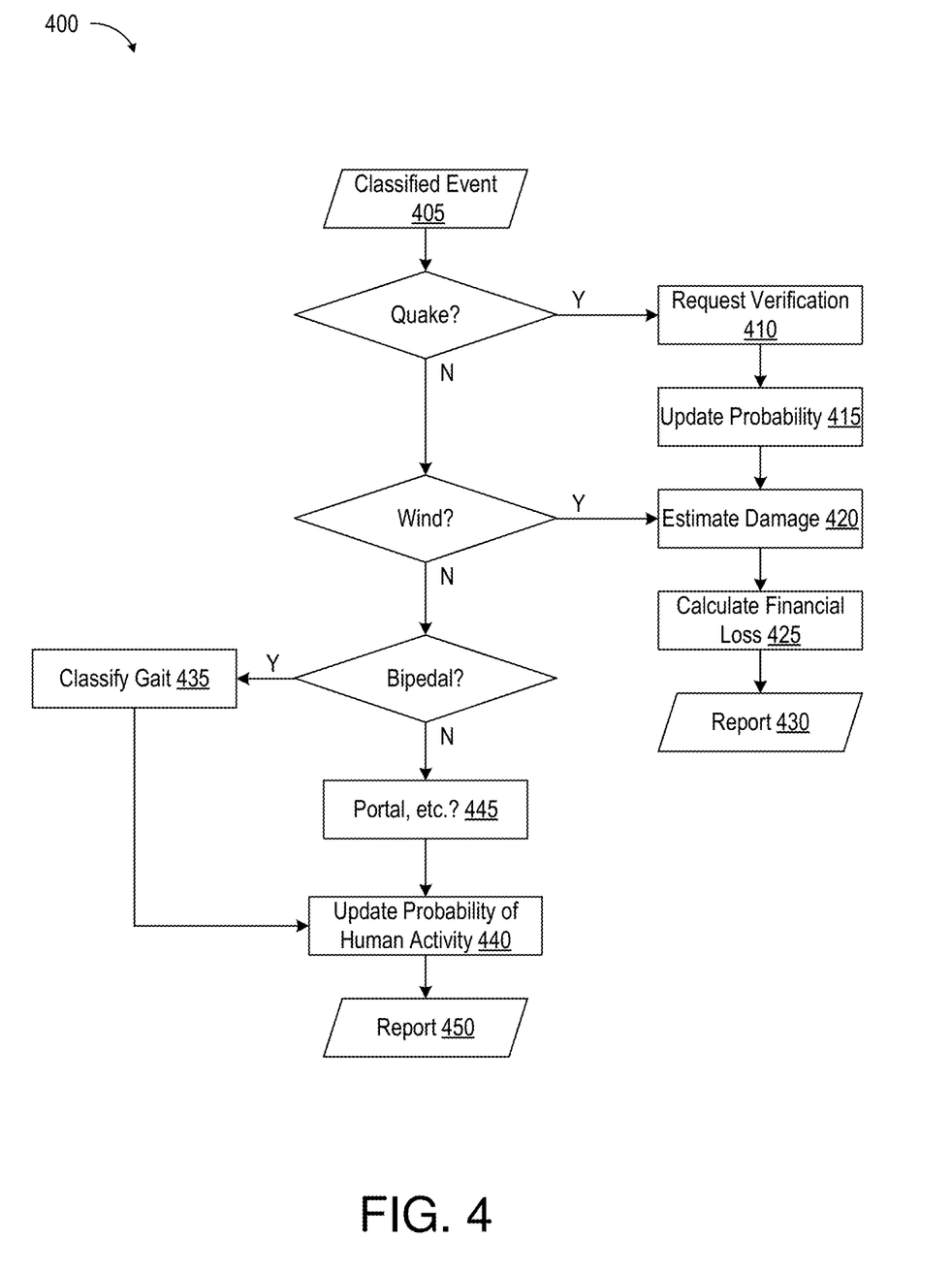
FIG. 4 is a flowchart 400 illustrating a method of event reporting in accordance with one embodiment.

FIG. 4 is a flowchart 400 illustrating a method of event reporting in accordance with one embodiment. The process begins with an event 405 classified as described in FIG. 3. If event 405 is or probably is an earthquake, appliance 105 issues a request for verification 410 to e.g. the USGS or other sensors and information sources as noted previously and updates the earthquake probability 415 accordingly. A damage estimate 420 is calculated using data from the reported event, and a financial-loss calculation 425 can be made from damage estimate 420. These data can then be incorporated into a report 430 to e.g. the homeowner, insurance provider, or other responsible entity or agency.

In the past 20 years, probabilistic catastrophe models have been developed to assist public agencies (e.g. FEMA, World Bank, California Earthquake Authority, school districts, etc.), insurance and reinsurance companies, corporations, and owners of a large number of properties subject to damage and loss of economic function from large earthquakes. The models utilize simulation techniques to calculate the property damage and insured or economic losses from hundreds of thousands of possible future earthquake events. The models incorporate current scientific research and building practices while specifically including uncertainty from both limited data and the inherent randomness associated with the loss events. Model outputs include such metrics as average annual loss, and loss severity for various return periods such as one in one hundred years or one in five hundred years that can be used by decision makers to manage, price and mitigate risk from damaging quakes. The models consist of four basic components involving the seismic hazard, inventory (or what is at risk), vulnerability to seismic shaking, and loss computation. Local soil effects, as defined by the amplification factor are included in the seismic hazard module The incorporation of sensor-based amplification factors (actual vs. statistical) reduces the uncertainty in loss estimates by replacing a series of statistical relationships with measured site values. Furthermore, the sensor amplification factor will provide greater precision and lower uncertainty since it will use the actual amplification factor at the site instead of the model amplification factor assigned to a midpoint of a generic soil category from the maps. The impact on loss probabilities is affected by a lower level of uncertainty. FIG. 4.5 in Grossi and Kunreuther, "Catastrophe Modeling: A New Approach to Managing Risk" (©2005 Springer Science+Business Media, Inc.) shows a typical exceedance probability curve from a loss model, with the vertical axis showing the exceedance probability and the horizontal axis the loss. (Grossi and Kunreuther is incorporated herein by reference.) The graph shows both a mean value and the $5^{th}$ and $95^{th}$ percent confidence levels. The greater the difference in these curves, the greater the uncertainty in the loss estimates. The use of sensor derived amplification values will reduce the $95^{th}$ percentile curve by moving it downward and closer to the mean while increasing the $5^{th}$ percentile curve by moving it upward closer to the mean. The impact on the $95^{th}$ percentile loss could be substantial. For example, the $95^{th}$ percentile curve shows a loss of about $6 billion for a 0.004 exceedance probability (or 1 in 250 years). Even a slight reduction in the curve from lower uncertainty could move the curve down, perhaps reducing the curve to a $5 billion loss. This is only an example of the impact, and needs to be confirmed with the loss modeling companies.

Replacing assumed soil amplification factors with site-specific sensor derived values will reduce overall uncertainty in loss estimates, with potentially major economic and financial consequences. Uncertainty in loss estimating has larger impacts on loss severity for longer return periods. When insurers, reinsurers, and government agencies attempt to manage catastrophic risk, they are faced with substantial uncertainty in quantifying such risk, especially for the very large loss events with return periods exceeding one hundred years. Sensor-based data permits such entities to better manage such risk and potentially reduce the cost of insuring and/or mitigating this risk.

If event 405 is wind-related, such as a hurricane placing stress on a dwelling, damage estimate 420 and financial-loss calculation 425 can be derived from classified event 405. Appliance 105 can, for example, compare earthquake excitation to existing fragility and vulnerability curve data (stored in the device or elsewhere) to assess level of damage and financial loss. Damage estimate 420 and loss calculation 425 can be computed remotely based on classified event 405, or some or all of the computation can take place on appliance 105.

If event 405 is classified as bipedal motion, processor 220 can compare the measured gait period against a library of authorized occupants listed in e.g. memory 225 to classify the gait 435 as having some probability of authorization. Appliance 105 maintains a probability of human activity, as detailed in the case of FIG. 3, which can be updated (440) based on the gait classification and other internal and external inputs. If event 405 is not bipedal, processor 220 can further specify the event type with reference to a library of event types. Processor 220 might match event 405 to the opening or closing of a portal (e.g., door or window) in step 445, for example, and update the probability of human activity accordingly. Appliance 105 can maintain or receive further data upon which to update the probability of human occupancy. Location data from an occupant's wireless device or the presence or absence of that device on the local wireless network might supplement this estimation, and appliance 105 can report the activity 450 or probability of activity accordingly, issue an alarm, etc.

Figure 5:
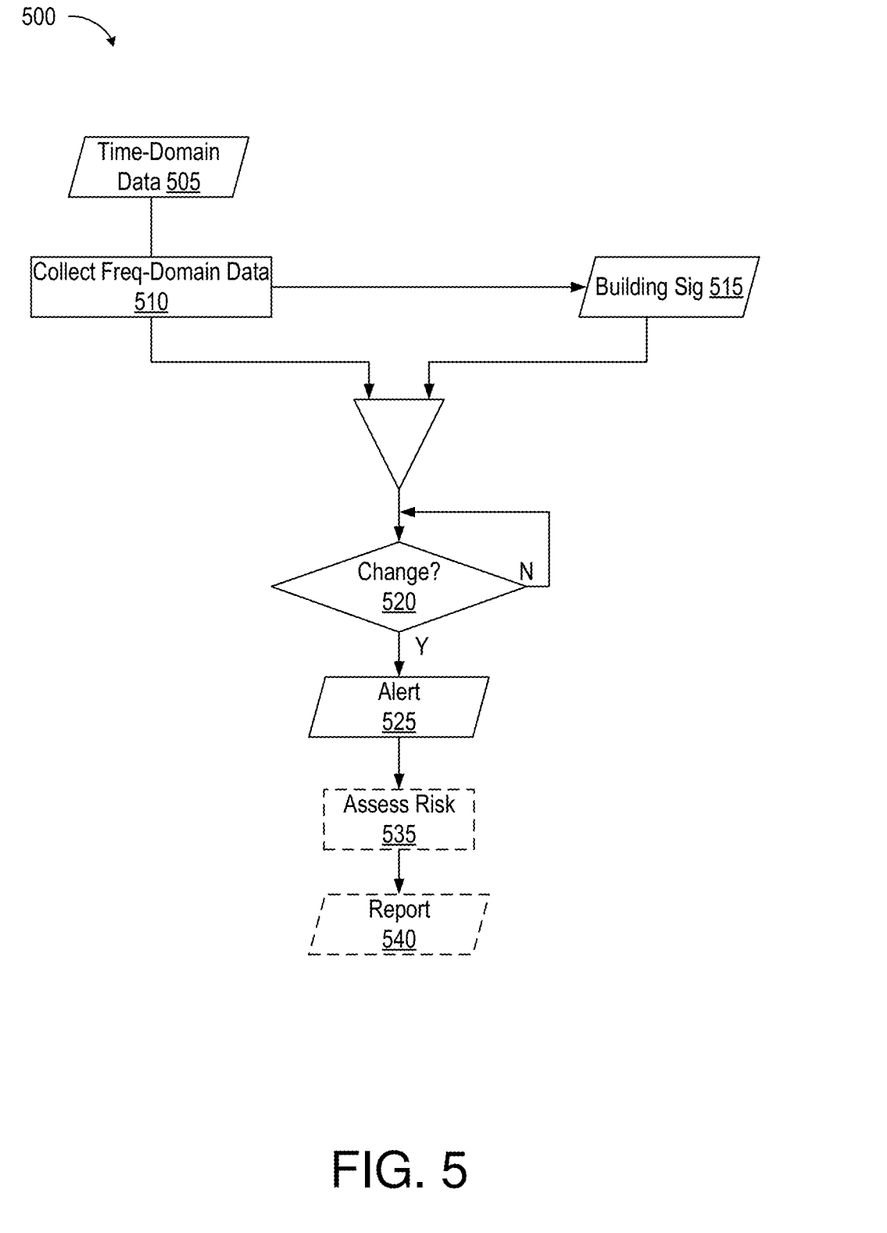
FIG. 5 is a flowchart 500 illustrating how time-domain accelerometer data 505 from one or more security appliances 105 associated with a given building can be used for long-term structural health monitoring.

FIG. 5 is a flowchart 500 illustrating how time-domain accelerometer data 505 from one or more security appliances 105 associated with a given building can be used for long-term structural health monitoring. The building, in combination with the underlying substrate, exhibits oscillation periods that can be identified in data 505 by collecting data 505 over extended periods, converting that data into the frequency domain, and isolating peak periods from noise (510). The magnitudes and frequencies of the dominant peaks are stored in local and remote memories as a bespoke building signature 515. Appliance 105 can provide periodic or event-driven comparisons between signature 515 with contemporary data to identify changes that exceed some desired threshold. Per decision 520, appliance 105 can issue an alert 525. These data, particularly where available over months or years, can be used to assess risk 535 and can be incorporated into an inspection report 540 to an owner, insurer, potential purchaser, or other interested entity. Signature 515 can provide a basis for detecting structural changes due to damage, unpermitted additions, snow loading, etc. Interested parties can act on information collected by appliances 105 to address structural problems to reduce risk and concomitant insurance costs.

Figure 6:
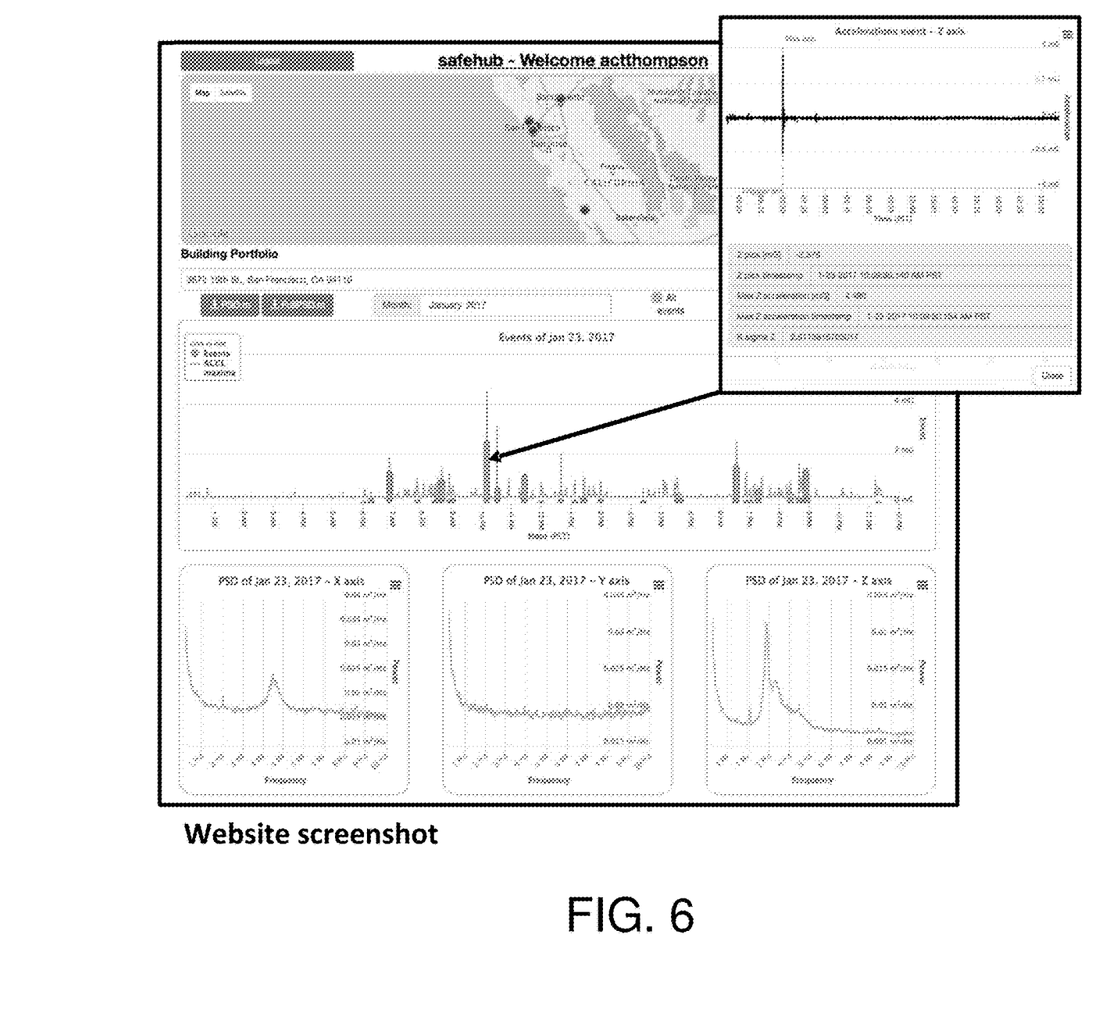
FIG. 6 is a screenshot of a browser-based interface—a "screenshot"—for data derived using a security appliance in accordance with one embodiment.

FIG. 6 is a screenshot of a browser-based interface—a "screenshot"—for data derived using a security appliance in accordance with one embodiment.

Figure 7:
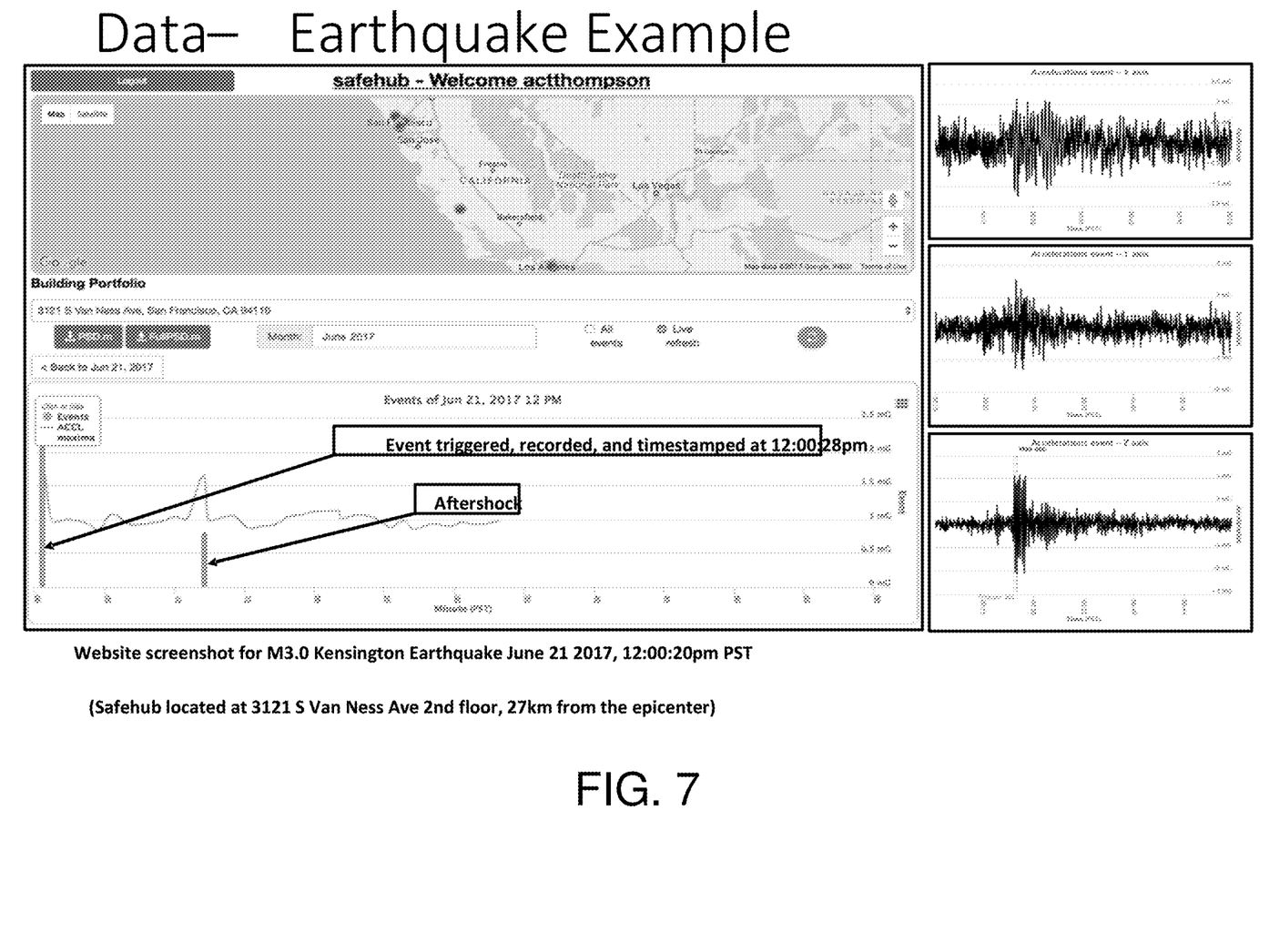
FIG. 7 is a screenshot of a browser-based interface illustrating a rendering of earthquake data derived using a security appliance in accordance with one embodiment.

FIG. 7 is a screenshot of a browser-based interface illustrating a rendering of earthquake data derived using a security appliance in accordance with one embodiment.

Figure 8:
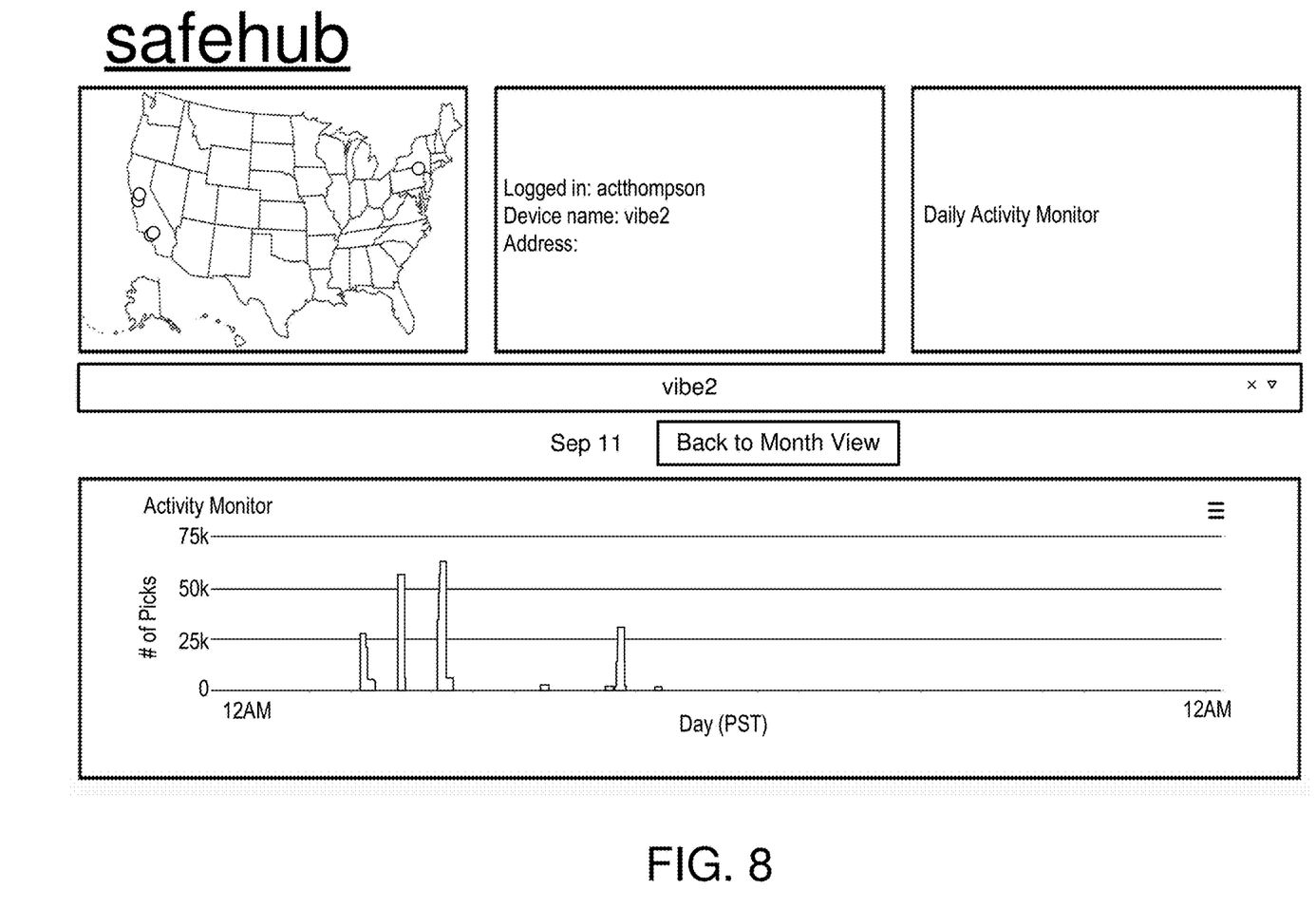
FIG. 8 is a screenshot of a browser-based interface illustrating a rendering of earthquake data derived using a collection of security appliances in accordance with one embodiment.

FIG. 8 is a screenshot of a browser-based interface illustrating a rendering of earthquake data derived using a collection of security appliances in accordance with one embodiment. A map highlights earthquake activity at a number of locations within the continental United States. An activity monitor field plots the number of samples that exceed a selected threshold, here referred to as "picks," relative to time of day for one of the highlighted locations selected by a user.

Figure 9:
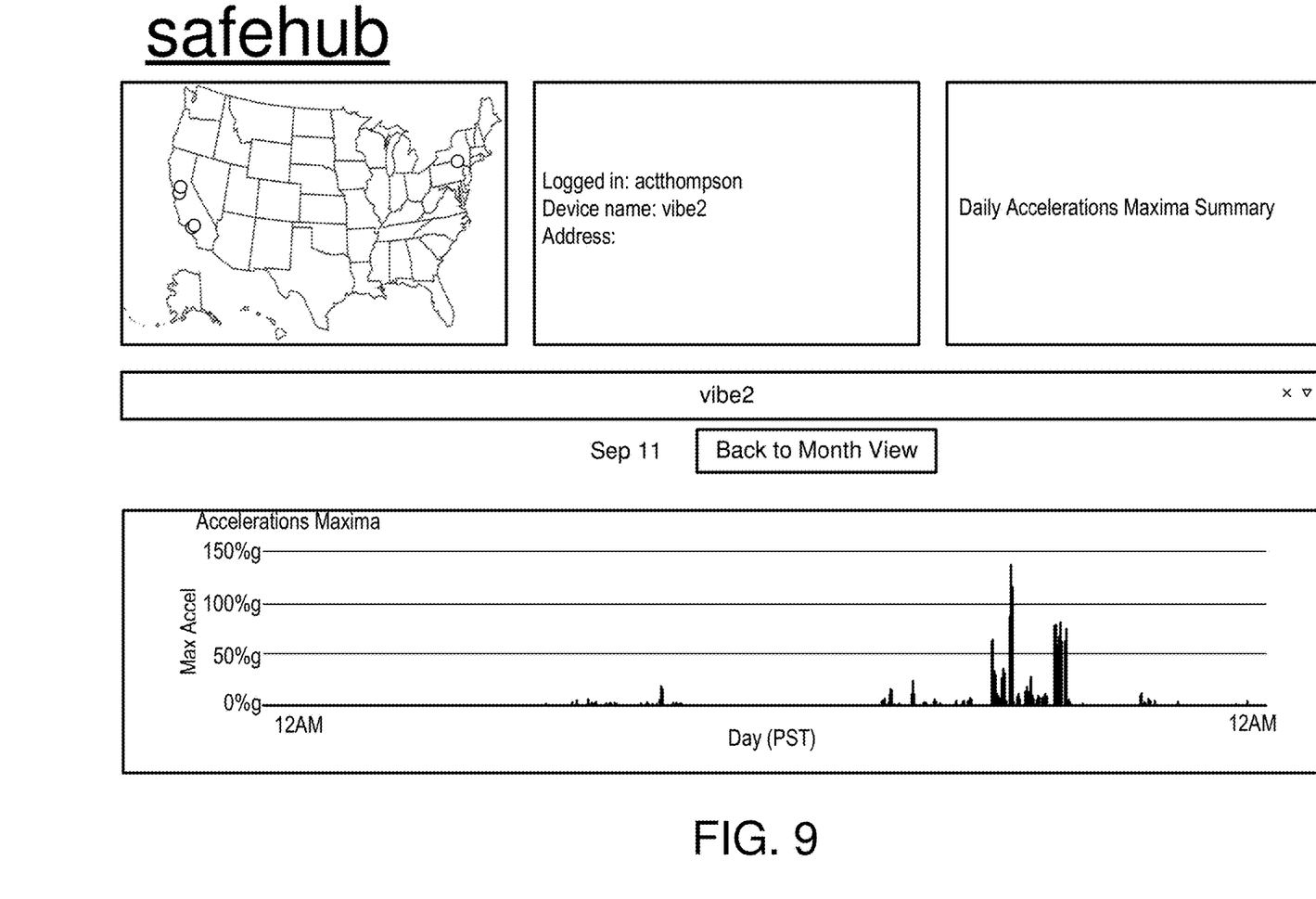
FIG. 9 is a screenshot of a browser-based interface illustrating a rendering of earthquake data derived using a collection of security appliances in accordance with one embodiment.

FIG. 9 is a screenshot of a browser-based interface illustrating a rendering of earthquake data derived using a collection of security appliances in accordance with one embodiment. A map highlights earthquake activity at a number of locations within the continental United States. An activity monitor field plots the maximum acceleration relative to time of day for one of the highlighted locations selected by a user.

Figure 10:
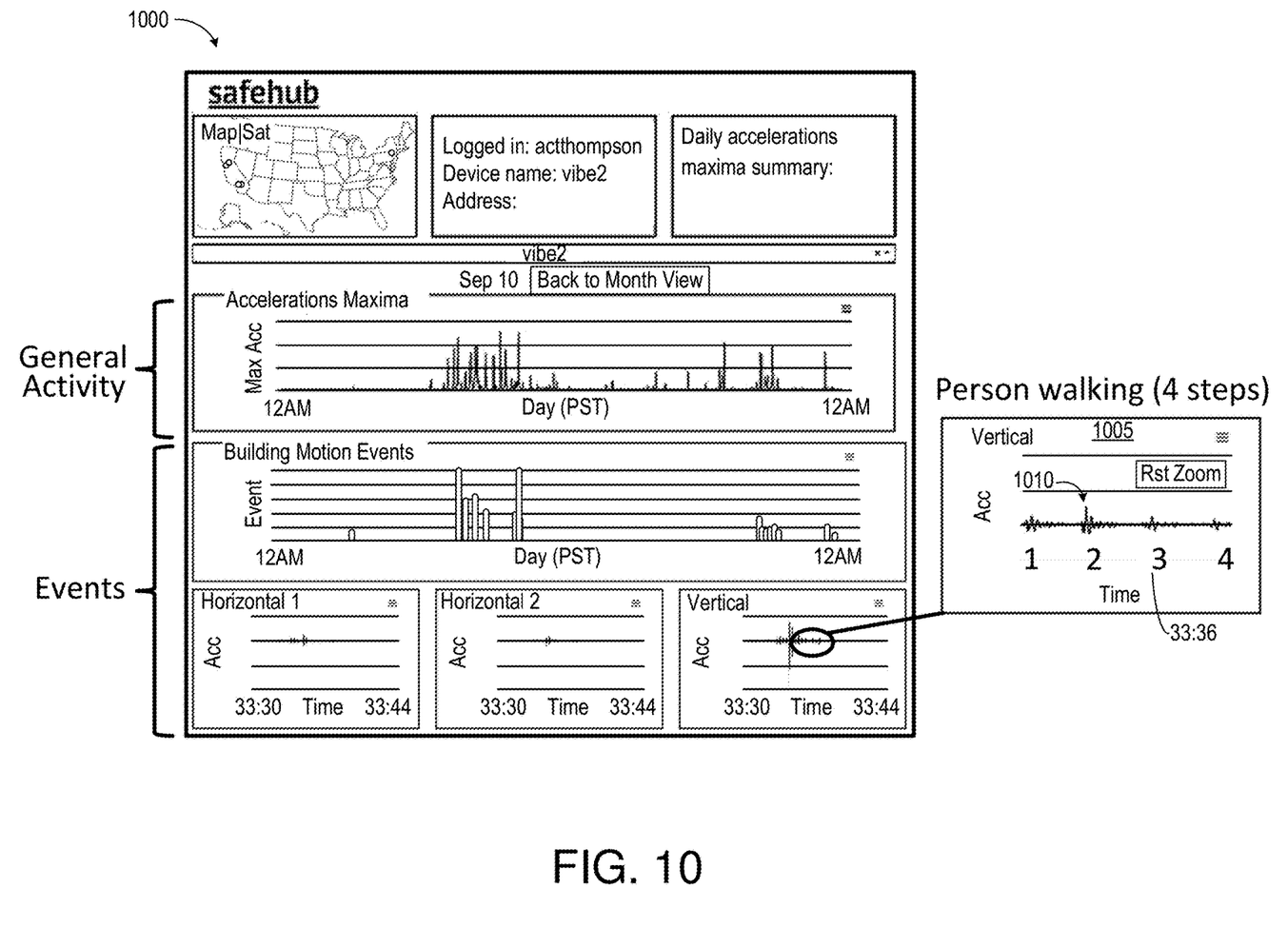
FIG. 10 is a screenshot 1000 of a browser-based interface illustrating a rendering for data from a security appliance in accordance with one embodiment.

FIG. 10 is a screenshot 1000 of a browser-based interface illustrating a rendering for data from a security appliance in accordance with one embodiment. The data were acquired over twenty-four hours. The screenshot includes fields for general activity and events. Accelerometer data, particularly vertical data, indicates a person walking. A window 1005, expanded at the lower right, shows four footsteps 1010 sensed using an accelerometer whose measuring direction is normal to the floor.

An appliance in accordance with one embodiment detects footsteps using a time-frequency analysis. Namely, a continuous wavelet transform is applied to the acceleration record captured with an accelerometer whose measuring direction is normal to the floor. The continuous wavelet transforms are computed over a range of frequencies close to an estimate of the natural frequency of the floor. The estimate of the natural frequency can be refined over time and responsive to occupant-induced vibrations. The floor natural frequency may also be estimated during a training sequence, where the user is asked to step on the floor.

The magnitudes of computed continuous wavelet transforms are used to determine that a brief event caused the floor to oscillate. In order to smooth this magnitude signal while preserving the peaks, a B-spline is used to interpolate between local maximums. Each time this smoothed signal exceeds a threshold, it is counted as a floor event. If two or more floor events occur within a duration close to the footstep tempo of a human being, then these floor events are counted as footsteps.

Figure 11:
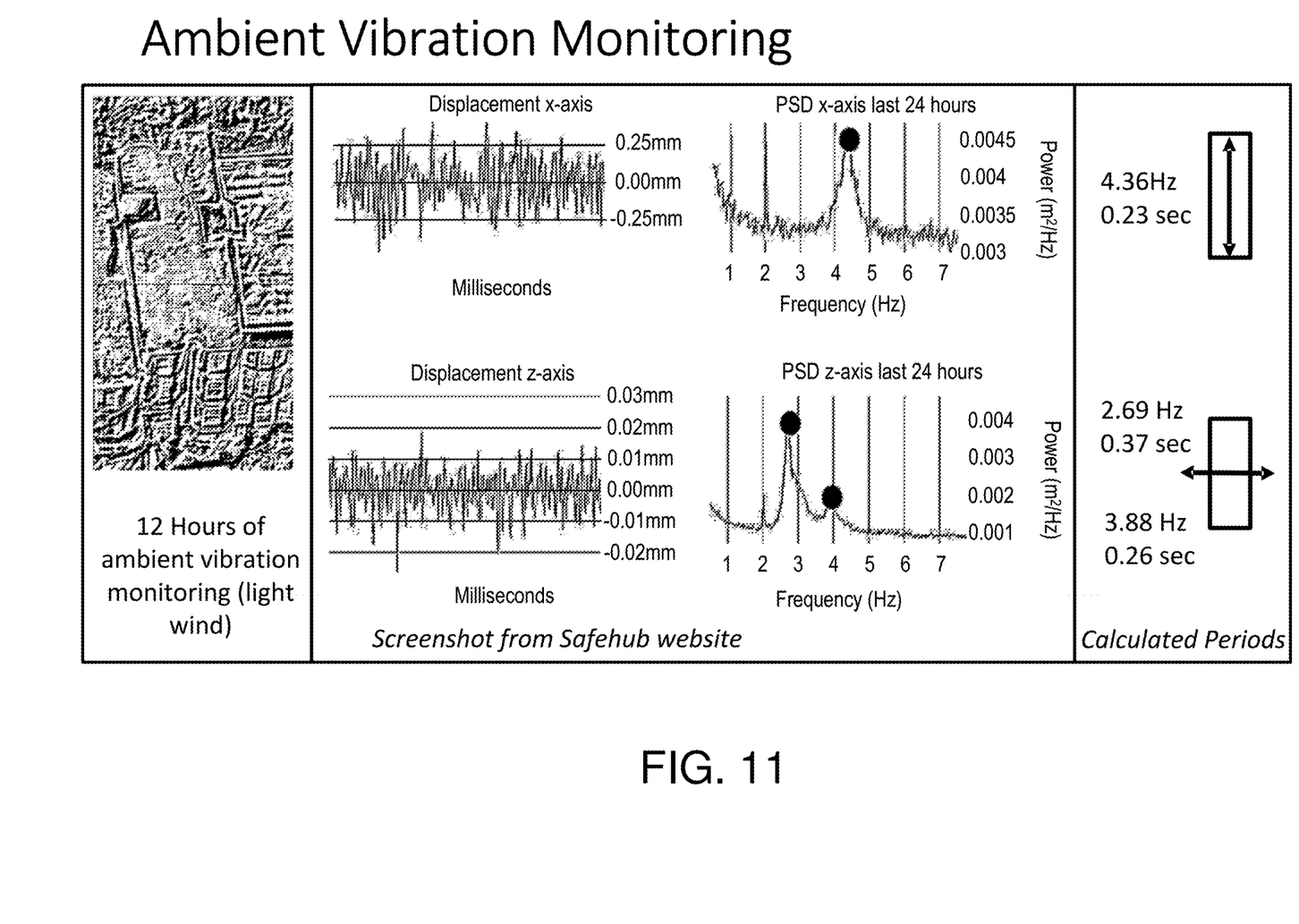
FIG. 11 is a screenshot of a browser-based interface illustrating a rendering for data from a security appliance in accordance with one embodiment.

FIG. 11 is a screenshot of a browser-based interface illustrating a rendering for data from a security appliance in accordance with one embodiment. The data were acquired over twenty-four hours for a dwelling experiencing light wind.

While the subject matter has been described in connection with specific embodiments, other embodiments are also envisioned. For example, security appliances of the type detailed herein can be affixed surreptitiously to the outsides of dwellings to develop a map of interior activity, or can be used to locate victims of e.g. earthquakes and mining accidents. Further, the technology could be used for the following potential applications: motion of high-rise buildings for occupancy comfort in wind events; vibration associated with rail vehicles, and the effect on the built environment; vibration associated with construction and the effect on the built environment; fire-code occupancy monitoring in buildings (e.g. are there too many people in a room?); and occupancy monitoring in buildings for the purpose of crowd assessment. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A system for analyzing dynamics of a building, the system including a motion sensor comprising:
   a housing;
   a wiring board enclosed within the housing;
   an accelerometer, mechanically coupled to the wiring board, to issue time-domain measurements of building movement;
   at least one processor coupled to the accelerometer, the at least one processor to:
      convert the time-domain measurements of building movement into frequency-domain measurements of the building movement; and
      calculate a probability of an earthquake; and
   a transceiver to transmit an earthquake-verification request responsive to the probability of an earthquake and receive an earthquake-verification signal to verify the earthquake responsive to the earthquake-verification request.

2. The system of claim 1, the at least one processor to indicate at least one of an activity and an event in the building based on at least one of the time-domain measurements and the frequency-domain measurements.

3. The system of claim 2, the at least one processor to further classify indicated events into ones of a plurality of event types, wherein one of the event types is the earthquake.

4. The system of claim 3, the event types including a wind event.

5. The system of claim 3, wherein the event types include bipedal locomotion.

6. The system of claim 5, the at least one processor to further classify the bipedal locomotion by gait.

7. The system of claim 6, further comprising memory to store an authorized-resident characteristic, and to compare the gait with the authorized-resident characteristic.

8. The system of claim 3, wherein the building comprises a portal for human ingress, the event types including an operation of the portal.

9. The system of claim 8, the at least one processor to calculate a probability of human activity state responsive to the operation of the portal.

10. The system of claim 1, the at least one processor to provide a financial loss estimation responsive to the frequency-domain measurements.

11. The system of claim 1, the at least one processor further to calculate soil stiffness at a site of the building from the frequency-domain measurements.

12. The system of claim 1, the at least one processor to calculate a probability of a human activity state for the building.

13. The system of claim 1, the at least one processor to share and compare acceleration measurements with motion sensors located in other buildings.

14. The system of claim 1, the at least one processor to sense changes in dynamic properties of the building responsive to the frequency-domain measurements of the building movement.

15. The system of claim 14, the at least one processor to calculate an estimate of damage to the building from the changes in the dynamic properties of the building.

16. The system of claim 1, further comprising electrodes to electrically couple the wiring board to the building and conduct the building movement to the accelerometer.

17. A motion sensor for analyzing dynamics of a building, the motion sensor comprising:
- a housing;
- a wiring board enclosed within the housing;
- an accelerometer, mechanically coupled to the wiring board, to issue time-domain measurements of building movement;
- at least one processor coupled to the accelerometer, the at least one processor to:
  - convert the time-domain measurements of building movement into frequency-domain measurements of the building movement; and
  - calculate a probability of an earthquake; and
- a transceiver to transmit an earthquake-verification request responsive to the probability of the earthquake.

18. The motion sensor of claim 17, the transceiver to receive an earthquake-verification signal responsive to the earthquake-verification request.

\* \* \* \* \*